Fig.1.

Sept. 4, 1956 J. W. HEIMASTER ET AL 2,761,666
REMOTELY CONTROLLED BORE MINING
MACHINE-AUTOMATIC COURSE
CONTROLLER
Filed Aug. 30, 1952 5 Sheets-Sheet 2

INVENTORS
JOHN W. HEIMASTER
STANFORD B. SPRACKLEN
BY D.C. Harrison
ATTORNEY

United States Patent Office 2,761,666
Patented Sept. 4, 1956

2,761,666

REMOTELY CONTROLLED BORE MINING MACHINE-AUTOMATIC COURSE CONTROLLER

John W. Heimaster, South Charleston, and Stanford B. Spracklen, St. Albans, W. Va., assignors to Union Carbide and Carbon Corporation, a corporation of New York Application August 30, 1952, Serial No. 307,246

15 Claims. (Cl. 262—19)

This invention relates to automatic mining apparatus and more particularly to remotely controlled or operated bore mining machines provided with adjustable-automatic course controllers.

In the use of remotely controlled or operated bore mining machines it is highly desirable, especially in cutting deep, i. e., long, bores, to maintain a true horizontal mining course transversely of the bore, else the machine, in time, cants somewhat and eventually spirals —making the resulting bore twisted which, in turn, interferes with the operation of flight conveyors attached to the machine, causing a shut-down of the mining operation. Also, as a result of such twisting, it is difficult, or may in some cases become impossible, to remove the machine from the bore by backing it out, which is necessary in this type of bore mining. Manual counter-correction by an operator at a remote control station requires definite thought and skill on the part of the operator in addition to his many other duties. Therefore, there is a great need for an automatic device to anticipate and make "spiral" corrections when required, so that the machine is kept automatically on a level course transversely of the bore at all times without any attention from the operator.

It is desirable, also, to be able to adjust manually and control automatically the vertical boring course of the machine longitudinally of the bore, i. e., boring on a level, climb, or dive, since the machine is underground and actually out of sight, so that efficient and effective mining is accomplished, depending upon the lay or tilt longitudinally of the bore of the strata being mined; because in manually guiding the machine from a station outside of the bore, any correction must be counter-corrected or the machine will continue to advance in an ever increasing change. Therefore, in the case of manual control, it is essential that the operator recognize the point at which such counter-correction is to be established. Otherwise the machine hunts—going too far up or down, cutting, i. e., mining, rock instead of coal, for example. If the machine tends to rise, i. e., to leave the confines of coal seams, for example, the first material appearing at the bore opening will be the material overlaying the coal seam, such as rock or shale. But it is impossible to change the course of machine instantaneously. Change of course, through manual correction, can only be effected slowly. If the top rock or shale is disturbed it is liable to fall down on the machine and bury it. Thus, there also is a great need for an automatic device to maintain the machine in a desired course and which course can if necessary or desirable be adjusted or changed at a remote station even while the machine is in operation.

The main object of this invention is to provide automatic course controller means for remotely-operated bore mining machines which satisfies such needs; is simple, economical; efficient, effective; and which accurately maintains the boring machine on a preselected course. Another object is to provide an automatic course controller for remotely controlled bore mining machines in which the course is manually adjustable at a remote station outside of the bore. A further object is to provide improved level sensitive means which are stable in operation even when subjected to the severe vibrations of the machine in use. Other objects will appear from the following description.

Generally in accordance with the invention there is provided in combination with a remotely controlled bore mining machine, an adjustable automatic course controller which accurately maintains the direction of boring operation of the machine in a desired path. The machine comprises an articulated body composed of a power-driven tractor and a front boring section provided with power driven earth (coal) boring means including one or more drills or cutting arms. The boring section is mounted forwardly of the tractor so that it can be swung or tilted about a transverse-horizontal axis, and canted about a longitudinal-horizontal axis, with respect to the tractor which is provided with separate power operated means for accomplishing such steering movements.

The boring section contains a dual-level-responsive-device having two level sensing elements arranged at right angles to each other—one responsive to any deviation of the boring section from level longitudinally of the machine, the other responsive to any deviation of the boring section from level transversely of the machine. Each level sensing device is coupled to a sensitive first signal source. The signal of this first source is balanced against an adjustable reference source mounted at a remote control station. The adjustment of the reference source, in the case of the vertical course controller, is set manually to predetermine the course that the machine will follow. Any unbalance in the signal-reference sources produces an output which has an effect on a suitable electronic circuit which, in turn, energizes relay means which actuate appropriate power-driven means to alter the course of the machine, correcting such unbalance. By means of the invention, the course of the machine is thus automatically controlled so that it follows a predetermined course within ±0.1 degree or less.

More particularly, the tilt and spiral controllers constitute separate detection and correction devices. Both controllers operate on the principle of electrical bridge circuits. In each circuit, one side of the bridge provides means for making the desired course setting, while the other side of the bridge detects any variation from such desired course. The functions of both sides of the bridges are accomplished by means of potentiometers. The detection sides of the bridges consist of sensitive potentiometers mechanically connected to pendula which detect deviations from desired tilt and spiral.

The control side of the tilt controller is adjustable to make course selection (climb or dive) possible. Since the desired course for spiral is always constant, i. e., true horizontal, the control side of the spiral controller is normally fixed. In either controller, when deviation from the desired course occurs the corresponding bridge circuit becomes unbalanced and the resulting voltage is impressed on the control grid of a thyratron. When this voltage overcomes the limiting feature of the voltage on the thyratron grid governed by a sensitivity control, the thyratron commences firing, energizing the coils of a differential relay. The relay activates a correction circuit in which there is a reversible motor for correcting spiral by canting, i. e., moving the boring section up and down on one side, while pivoting about the other side of the boring section, or a solenoid-operated hydraulic four-way valve which causes the positioning cylinder to swing the boring section up or down about the horizontal-transverse axis.

Figure 3:
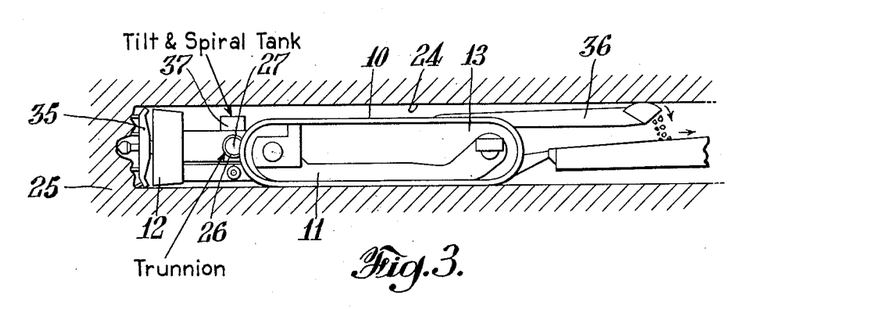
Fig. 3 is side view of mining machine in operation in a bore.

As shown in the drawings, Fig. 3, the remotely operated and controlled bore mining machine 10 comprises an articulated body 11 composed of a front boring section 12 (machine front gear housing) mounted on a power driven tractor 13. The front boring section 12 is coupled to the tractor 13 for swinging adjustment about a transverse-horizontal "tilt" axis 14, Fig. 4, to tilt the front portion of boring section 12 to a certain extent up or down with respect to the tractor. Such tilt-adjustment is accomplished through suitable power means such as an hydraulic system including an hydraulic motor 15 mounted on the tractor, having a piston rod 16 connected to the rear of boring section 12 by a lever 17 which extends rearwardly of such axis 14. The hydraulic motor 15 has a cylinder 18 which is supplied with hydraulic fluid, under pressure, through hydraulic lines 19, 20 from an hydraulic tank and pump unit 21 by way of a solenoid operated four-way and by-pass valve device 22 which is provided with suitable regulating valves.

Figure 4:
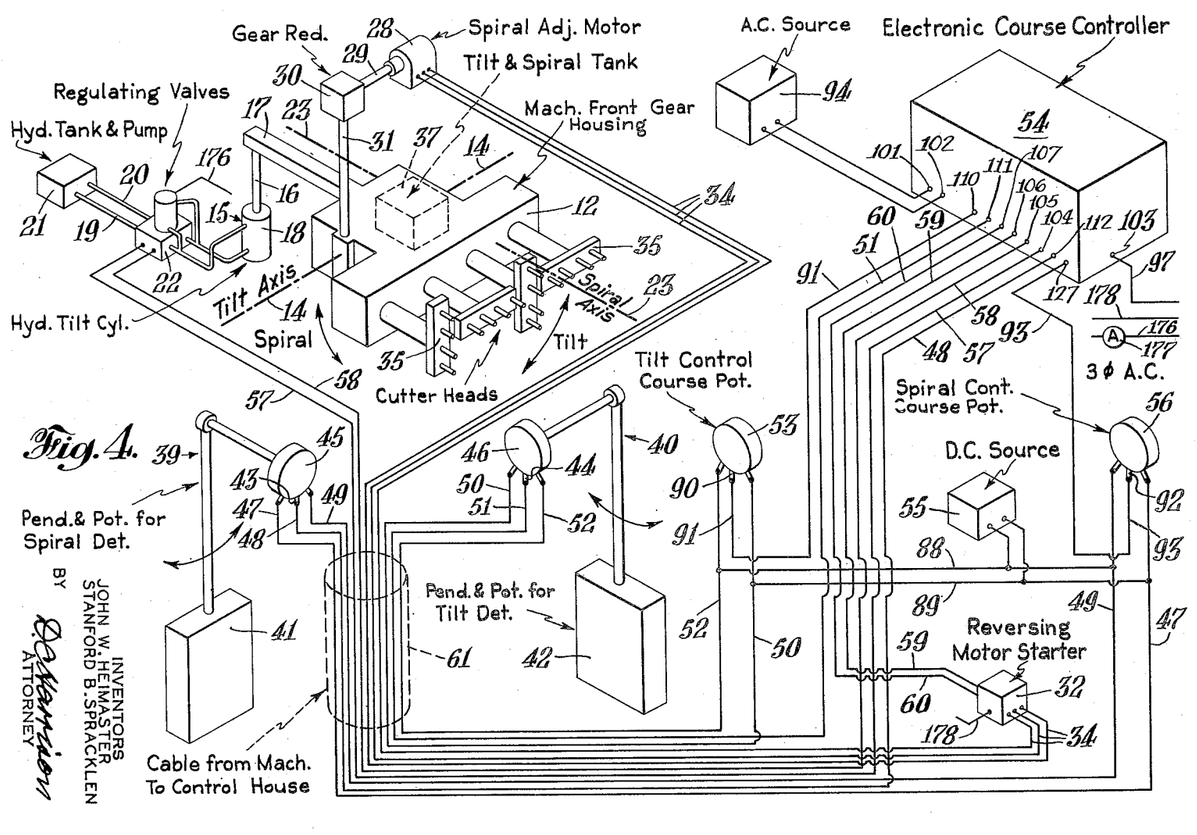
Fig. 4 is a schematic diagram of the invention.

The front boring section 12 of the machine 10 is also mounted on the tractor for limited adjustment about a horizontal-longitudinal "spiral" axis 23, Fig. 4, for correcting any tendency of the machine to spiral in cutting a bore 24, Fig. 3, in the earth 25. Such "spiral" adjustment is accomplished by elevating or lowering a trunnion bearing 26 on one side of the boring section with respect to a trunnion bearing 26 on the other side, which bearings 26 carry stub shafts or trunnions 27 connecting the boring section 12 to the tractor 13, through a spiral adjustment motor 28 mounted on the tractor and connected to such bearing 26 by a shaft 29, a worm gear reduction unit 30, and a feed screw 31, the latter being meshed with a nut attached to the bearing. Mounted at the remote station is a reversing motor starter 32 which is electrically connected to the motor by suitable conductors 34.

The boring section 12 is provided with one or more power driven earth (coal) boring-cutter heads 35, four in the present case. The heads 35 are operated in synchronism to cut and break the strata, such as coal, being mined as the machine 10 is driven forwardly by the tractor 13, Fig. 3, boring the hole 24 in the desired strata, the mined material being conveyed to the rear by a suitable flight conveyor 36 to which may be attached a string of other flight conveyors as the depth (length) of the bore 24 increases as the mining operation progresses.

Figure 5:
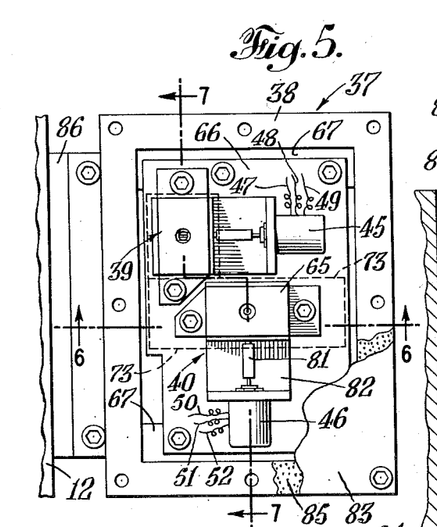
Fig. 5 is a plan view of the tank containing the tilt and spiral level sensitive mechanisms.
Figure 6:
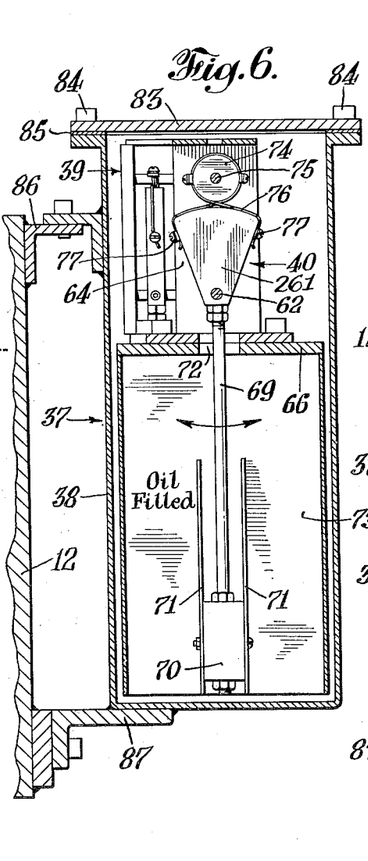
Fig. 6 is a vertical section taken on line 6—6 of Fig. 5.
Figure 7:
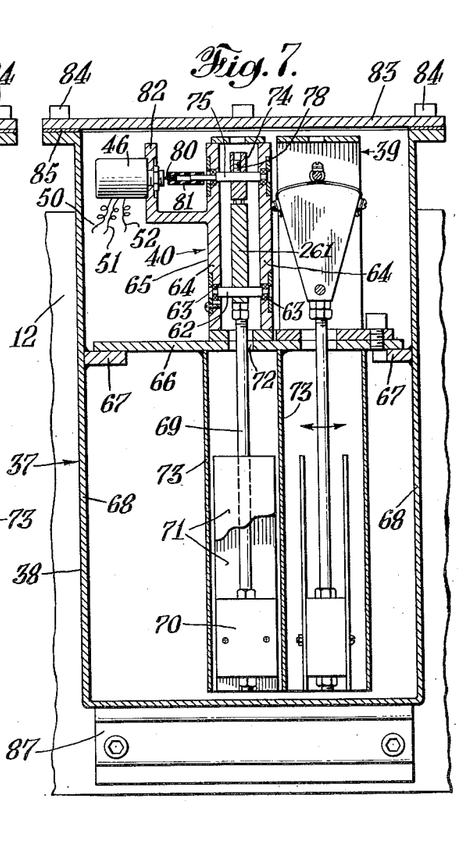
Fig. 7 is a vertical section taken on line 7—7 of Fig. 5.

Housed within a protective opening within and carried by the front boring section 12 is a dual level sensitive unit 37, Figs. 5–7, comprising a tank 38 containing a suitable liquid (oil) in which are immersed a spiral level deviation detection device 39 and a tilt level-deviation detection device 40. Such devices consist of pendulums 41, 42 arranged at right angles to each other, which are mechanically connected to the respective movable tap or contact 43, 44 of corresponding potentiometers 45, 46.

The potentiometers are electrically connected by suitable conductors 47, 48, 49, and 50, 51, 52, respectively, Fig. 4, to a tilt control course potentiometer 53, an electronic course controller 54, a direct current source 55 of stabilized voltage such as a 10 volt D. C. source (battery), and a spiral control course potentiometer 56, all of the latter 53—56 being located at a safe station which is remotely positioned with respect to the machine 10, preferably outside of the bore 24 made thereby. Conductors 34 and 47—52; and conductors 57, 58 leading to the solenoid operated hydraulic valve device (regulating valves) 22 are carried by a suitably shielded cable 61 leading from the machine 10 and through the bore to such remote station. The cable also includes a common power lead 176 connected to the tilt control 22, but such lead has been omitted from the cable shown in Fig. 4.

Since the level sensitive devices 39, 40 are similar, only one will be described in detail. Referring to Figs. 5–8, the tilt level sensitive device 40, for example, comprises a segment 261 mounted on a horizontal lower shaft 62 which is supported by ball bearings 63 in the upright walls 64 of a bracket 65 mounted on a horizontal base plate 66. The base plate is in turn mounted at its opposite ends on shelves 67 which are secured to the inner surfaces of the end walls 68 of the tank 38, so that the plate is positioned in the upper half of the tank. A pendulum rod 69 is connected at its upper end to the base of the segment 261, and carries a pendulum weight member 70 at its lower end, baffle plates 71 being attached to the front and back of such member 70. The pendulum rod 69 extends downwardly through a suitable opening 72 provided therefor in the bracket 65 and base plate 66 and is thus free to tilt with respect to the tank 37 about the axis of shaft 62. Such movement takes place between side baffle plates 73 which extend downwardly from the base plate 66 adjacent the edges of the plates 71. Thus, the action of the pendulum 70 under the influence of gravity is stabilized even though the tank is subjected to considerable vibration when the machine is in operation.

Figure 8:
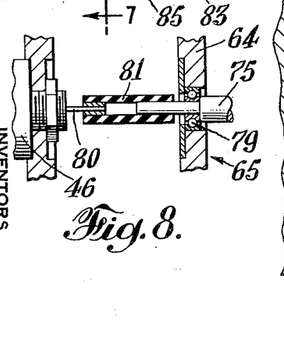
Fig. 8 is an enlarged fragmentary sectional view of the connecting means between the micro-torque potentiometer and the upper tilt shaft.

The arcuate top of the segment 261 is connected to a wheel 74 mounted on a horizontal upper shaft 75, by a flexible thread 76, the ends of which are attached to the segment by screws 77; the thread being wound around the wheel 74. The wheel is fastened to the shaft 75 by a set screw 78, and the shaft is supported by ball bearings 79 mounted in the walls 64 of the bracket 65. One end of the shaft 75, Fig. 8, is connected to the end of a shaft 80 of potentiometer 46 which is preferably a micro-torque type, by a flexible tubular coupling 81, such as a plastic tube. The potentiometer 46 is mounted on an extension 82 of the bracket 65 so that the shaft 80 thereof is alined with shaft 75. Thus, any deviation of the tank 38 from a normally vertical position, causes the potentiometer to be turned by virtue of the fact that gravity tends to hold the pendulum in a vertical position at all times. The tank 38 is filled with a suitable liquid, oil for example, and sealed by a cover plate 83 secured in place on top of the tank by screws 84, a suitable gasket 85 being sandwiched between the tank and the cover plate. Brackets 86 and 87 support the tank 38 in place on the boring section 12 of the machine 10.

Figure 1:
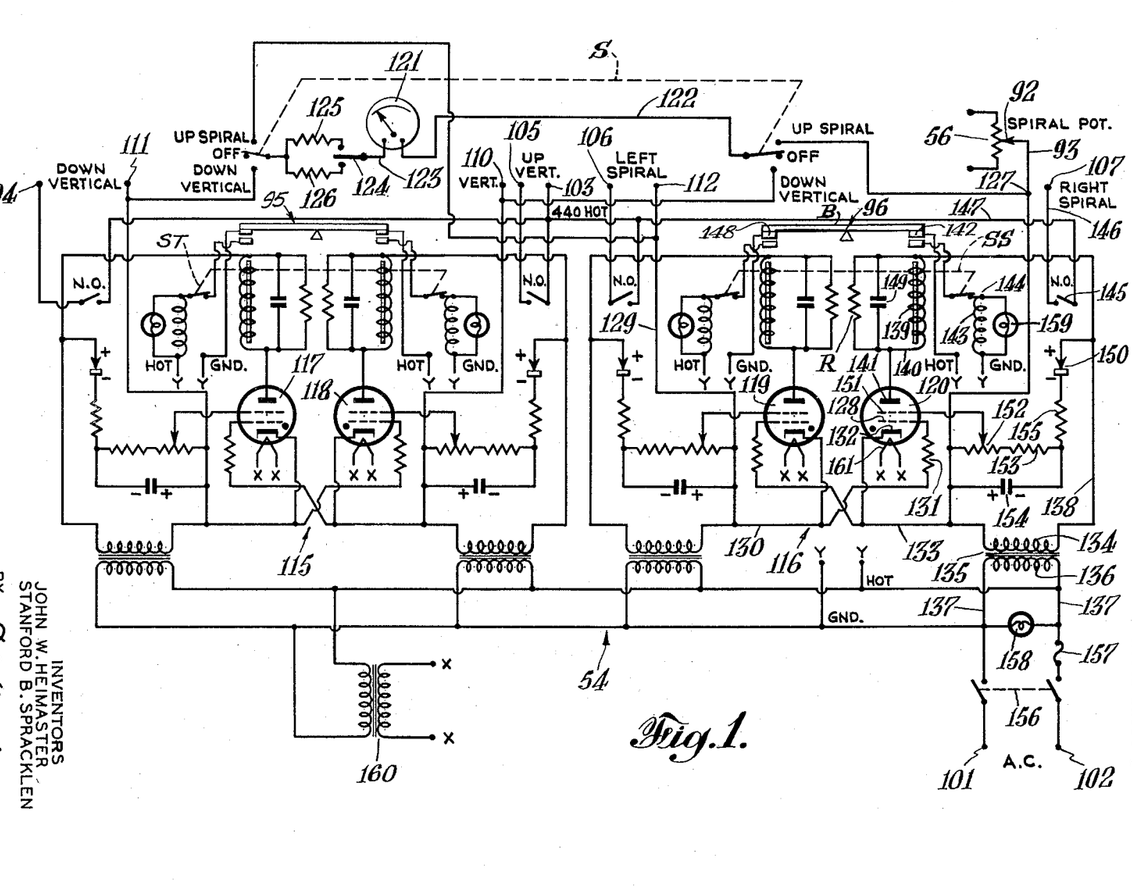
Fig. 1 is a circuit diagram of a duplex automatic course control system illustrating the invention, particularly the electronic course controller.
Figure 9:
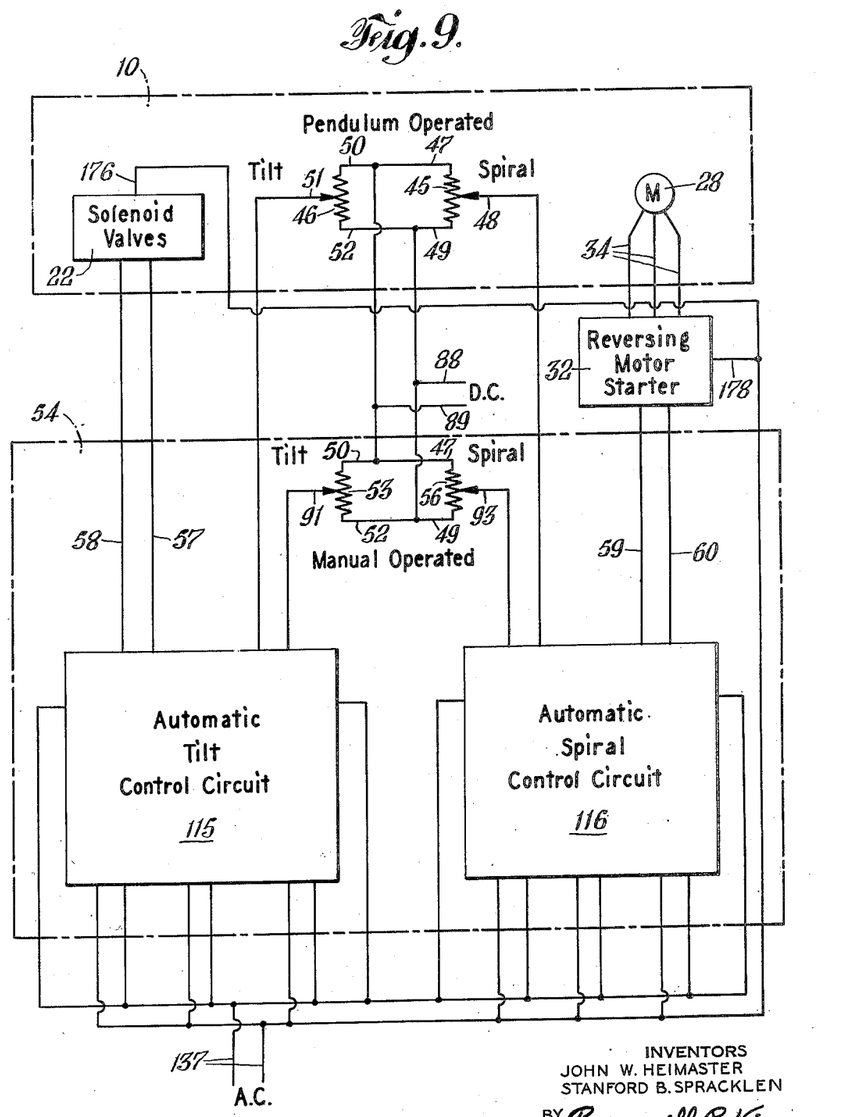
Fig. 9 is a block diagram showing the "bridge" relationship of the invention.

The potentiometers 45 and 56, and 46 and 53 are connected to provide bridge circuits, Fig. 9, through conductors 47, 49 and 50, 52 respectively, Fig. 4. The outside taps of both bridge circuits are connected to wires 88 and 89 which are fed by the stabilized source 55 of direct current, Fig. 4. The center tap or slider terminal 43 of the spiral detection potentiometer 45 is connected to wire 48, Fig. 9, and center tap or slider terminal 44 of the tilt detection potentiometer 46 is connected to wire 51. The center tap or slider terminal 90 of the tilt control potentiometer 53 is connected to wire 91, Fig. 9. The spiral control side of the bridge is within the chassis of the course controller 54, but its center tap or slider terminal 92, Fig. 4, is connected to wire 93, Fig. 9. A stabilized voltage source 94 of alternating current which operates differential relays 95 and 96, Fig. 1, is connected to terminals 101 and 102 of the course controller 54. A three-phase source of power (not shown, such as 440 volts A. C.) for the control circuits to the machine is connected to leads 97, 176 and 178, Fig. 4, terminal 103 of the controller being connected to conductor 97. Controller terminals 104 and 105 are connected to conductors 57 and 58 which when energized induce the shifting of the four-way hydraulic valve device 22 on the machine 10 which corrects for tilt deviation. Controller terminals 106 and 107 are similarly connected to conductors 59 and 60 which control the reversing motor starter 32, causing the spiral motor 28 to correct for spiral deviation.

The two circuits 115, 116, shown in Figs. 1 and 9, automatically correct any tendency of the machine to spiral horizontally, or any tendency of the machine to tilt vertically. The controlling components of such circuits are the thyratron tubes 117, 118 and 119, 120, Fig. 1. The controlling units on the machine are the pendulums which activate the potentiometer slider terminals. The difference in voltage between the slider terminal 43 of the transverse tilt detection potentiometer 45 and the slider terminal 92 of the transverse tilt control potentiometer 56 is applied across course controller terminals 112 and 127 which connect with the transverse tilt circuit 116. Similarly, the difference in signal voltage between the slider terminal 44 of the longitudinal tilt detection potentiometer 46 and the slider terminal 90 of the longitudinal tilt control potentiometer 53 is applied across course controller terminals 111 and 110 which connect with the longitudinal tilt circuit 115.

The signal voltage resulting from unbalance of the bridge circuit is impressed on the control grid of the thyratron tube, being connected between the control grid and the cathode. This fires the tube. But since the plate supply is alternating current, the plate voltage of the tube drops to zero once during each cycle of the supply frequency, permitting the bridge circuit voltage, or grid bias to regain control of the plate current, which fires the tube when the bias voltage is at the firing level. The D. C. screen voltage also controls the firing point of the thyratron. Provision has been made to utilize this voltage as a sensitivity control.

Consider an operating example. Suppose an unbalance exists in the outside bridge circuit (from the pendulum-potentiometer system on the machine) which applies a voltage $V_1$ to the control grid of the tube. The voltage is such that the thyratron fires, thus energizing a relay in the plate circuit. Now if the D. C. screen voltage is changed in such a direction as to cut off the plate current of the thyratron, the tube ceases firing. The control grid voltage must now be changed to a new voltage $V_2$ before the thyratron will fire again and re-energize the relay in the plate circuit.

As shown in Fig. 1 the two thyratrons 119, 120 of the spiral circuit 116 are connected to the bridge circuit in such a way as to make the control grid voltage of one of the tubes increase in a positive direction while that of the other increases in a negative direction. Thus one tube will fire while the other is cut off by a given unbalance of the control bridge circuit and a given setting of the sensitivity controls.

The plates of the two thyratrons are connected to the coils of the differential relay 96, which is so constructed as to provide mechanical interlocking between contacts. This assures that only one auxiliary relay will be energized at one time. The system is also electrically interlocked, as it is not possible for both tubes 119, 120 to fire at the same time.

By proper adjustment of the sensitivity controls, it is possible to reach a point at which neither tube will fire when the control bridge is balanced to within 0.10 volt and thus neither auxiliary relay will be energized. This is a point of optimum balance for the spiral control system. The same conditions are true for the other half (115) of the circuit, which indicates and automatically controls the tilt, or motion of the machine vertically.

The "spiral" bridge is adjusted to zero, or balance, by means of adjustable contact 92, the voltage balance or unbalance of the bridge being indicated by a meter 121 which is connected to opposite sides of a selected bridge by a switch S through a conductor 122 on one side and a conductor 123 on the other side, the latter including a switch 124 for inserting a resistor 125 or 126 in circuit with the meter 121. When the bridge is greatly unbalanced, relative high resistor 126 is inserted, when slightly unbalanced, relative low resistor 125 is inserted.

Assuming that the bridge is balanced and that the machine deviates from the course desired, the pendulum 41 connected to potentiometer 45 unbalances the bridge. Assuming that this unbalance is such that terminal 127 is positive with respect to terminal 112, the potential of control grid 128 is increased through circuit 129, 130 and resistor 131. This causes thyratron 120 to fire, causing current to flow through cathode 132, conductor 133, power source 134 (the secondary of an A. C. transformer 135—the primary 136 of which is connected across power leads 137), conductors 138, winding 139 of the "Sigma" differential relay 96, conductor 140, and plate 141 of the tube 120. This energizes coil 139 of the relay 96, causing normally open switch 142 to close, which energizes coil 143 of an auxiliary relay 144, and closing normally open switch 145 thereof. Power thus flows from the A. C. power source through lead 97, terminal 103, lead 147, switch 145, lead 146, terminal 107 and conductor 60 to the reversing motor starter 32, and returns to the power source through lead 178. This causes motor 28 to correct the deviated condition, until the potentiometer 45 brings the bridge back into balance.

The switches 142 and 148 of the differential relay 96 are mechanically connected by a pivoted bar B so that it is impossible for both of them to be closed at the same time. In addition to such mechanical interlock of the "Sigma" differential relay, an electrical interlock exists as pointed out below because of the nature of the circuit. Thus, in case of a failure of either differential relay winding it is impossible for more than one auxiliary relay switch to be closed at any given time.

Alternating current is used to supply voltage to the plate 141 of thyratron 120 in order that control grid 128 will control the firing of the thyratron at all times. Condenser 149 and resistor R are connected across the winding 139 to prevent A. C. chatter in the differential relay 96. Rectifier 150 is connected to supply a positive potential to the screen grid 151 of thyratron 120. This potential may be varied by adjusting potentiometer 152 thus causing potentiometer 152 to act as a sensitivity control. Resistor 153, condenser 154 and resistor 155 constitute a filter circuit for the screen grid potential. Power (A. C.) is supplied to the electronic course controller 54 through a switch 156 and fuse 157. Lamp 158 is connected across leads 137 to serve as an on—off power indicator. Lamp 159 is connected across coil 143 to indicate when the auxiliary relay 144 is energized, closing switch 145. Transformer 160 is connected to supply power derived from line 137 to filament 161 of thyratron 120 through leads X—X. Power is supplied directly to auxiliary relay 144 from the power line 137 through leads Y—Y.

Switch S is used to connect meter 121 either to the spiral control circuit or to vertical control circuit.

Any tendency of the front boring section 12 to become unbalanced is automatically corrected by movement of the section 12 in the opposite direction. The tilt control system operates similarly, terminal 110 of the automatic course controller being connected to conductor 51 which leads to the center tap 44 of the tilt detector potentiometer 46.

Figure 2:
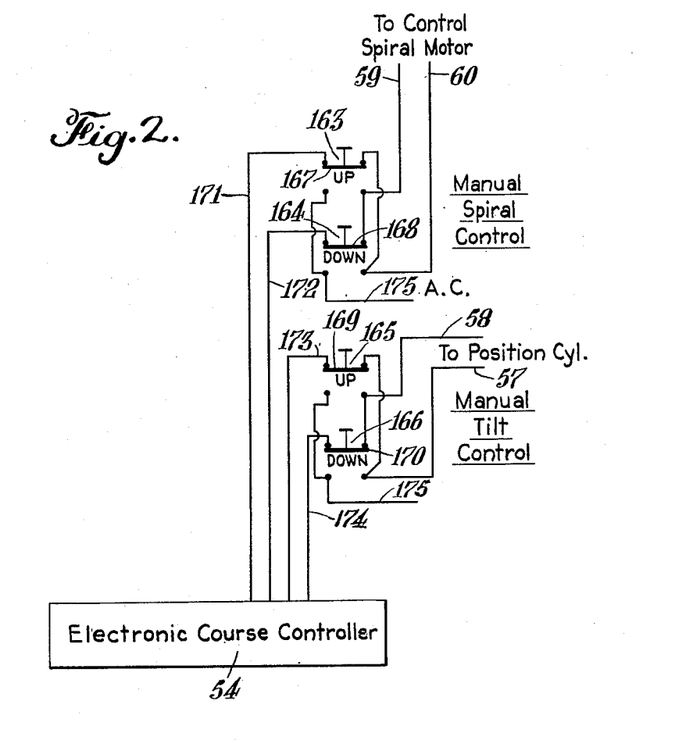
Fig. 2 is a circuit diagram of the electrical components which are connected to the electronic course controller.

As shown in Fig. 2, a manual push button station is provided which, when operated, over-rides the automatic course controller 54. Such station is provided with "up" and "down" buttons 163, 164 and 165, 166, respectively, mechanically connected to corresponding normally closed switches 167, 168 and 169, 170. The "spiral" push buttons 163 and 164 are each normally urged into such position that the conductors 59 and 60 leading to the spiral control reversing motor starter 32 are electrically connected to terminals 107 and 106, respecively, of the electronic course controller, through leads 171 and 172. Likewise, the tilt push buttons 165 and 166 are each normally urged into such position that the conductors 57 and 58 leading to the tilt control device 22 are electrically connected to terminals 105 and 104, respectively, of the electronic course controiler, through leads 173 and 174. Each of the switches 167—170 is adapted, when the corresponding button is pressed, to open the circuit therefrom leading to the automatic course controller, and close a temporary circuit which energizes the desired control device in the desired way.

Thus, holding down "up" button 165 closes switch 169 between conductor 58 and lead 175 which is connected to one side of the A. C. source. This energizes a spring loaded solenoid valve between line 58 and the solenoids common phase line 176. The valve shifts and admits oil to a cylinder on one end of the four-way valve device 22, Fig. 4, and shifts it to the up position, allowing oil flow to the positioning cylinder 18 which tilts the front gear box 12 upward about axis 14. When the button 165 is released, the solenoid valve opens to the tank 21. The spring loaded four-way valve shifts back to neutral, blocking the oil inlets to both ends of the positioning cylinder 18 and locking the gear box 12 in the desired position. To move the gear box 12 down to any desired position "down" button 166 is pressed, closing switch 170. This energizes the other spring loaded solenoid valve between conductor 57 and the solenoids common phase line 176. The valve shifts and admits oil to the cylinder 18 on the other end of the four-way valve device 22 and shifts it to the "down" position, allowing oil flow to the other side of the positioning cylinder 18, which tilts the front gear box 12 downward. Upon releasing the button 166 the solenoid valve opens to the tank 21 and the four-way valve device 22 shifts back to neutral. An ammeter 177 is connected in the solenoids common wire 176 as a check on the current demand of the solenoids. The manual vertical control is used for a quick directional change.

In case it is desired to eliminate one or both of the automatic controls, double-pole double-throw switches ST and SS are provided in the circuits of relay windings 143. Thus, by opening such switches, the course of the machine can be manually controlled without interference.

The center tap 92 of the spiral potentiometer 56 is adjusted so that the automatic course controller system of the invenion funcions to keep the front boring or head section 12 of the machine on an even keel, i. e., level transversely of the bore 24, automatically, and without any further attention by the operator during the subsequent bore mining and loading operation of the machine 10 underground, which is usually out of sight of the operator. The articulated or jointed body 11 of the machine follows the path cut by the head section 12. Spiralling is thus completely eliminated by the invention.

The desired vertical course of the machine 10 is set by manually adjusting the center tap 90 of the tilt control course potentiometer or selector 53, and the automatic course controller system of the invention also functions smoothly to maintain the head section 12 of the machine on the selected course. Since the course selector 53 is located at a safe control station, remote from the machine 10, automatic mining is accomplished without danger to the operator, in accordance with the lay of the strata (coal) being mined.

Use of the manual spiral push buttons over-rides the automatic spiral controller. Holding down "up" button 163 energizes the "up" coil through wires 59 and 60, closing starter 32 contacts. This energizes the spiral motor leads 34 and elevates the right side of the gear box 12 and heads with respect to the tractor 13. Releasing the button 163 breaks the circuit and stops the motor 28. Pressing "down" button 166 energizes the "down" coil through wires 57 and 58, closing the other set of contacts in starter 13. This again energizes the spiral motor leads 34, reversing the motor 28 and lowering the right side of the gear box 12 and heads 35 with respect to the tractor 13. Releasing the button breaks the circuit and stops the motor 28. The manual spiral control thus provides means for accomplishing quick spiral correction while drilling, i. e., mining is in progress. Position of the spiral control with respect to the horizontal may be indicated by a voltmeter connected between the slider terminal of the transverse tilt control potentiometer 56 and one of its end terminals; and that of the longitudinal tilt control may be indicated by a voltmeter similarly connected to the respective terminals of the longitudinal tilt control potentiometer 53. In each instance a resistor equal in value to the resistance of the voltmeter should be connected between the slider terminal and the other end terminal of the potentiometer in order to maintain electrically balanced conditions.

While the invention is well suited for bore mining coal, it is not limited to such material, but may be used to mine other materials such as mineral ores, limestone, etc.

We claim:

1. In a remotely controlled bore mining machine comprising an articulated body composed of a tractor and a front boring section provided with power-driven earth boring means in the front thereof, power-driven vertical course steering means acting when operated to swing said boring section with respect to said tractor about a substantially horizontal-transverse axis; power-driven boring-section canting means acting when operated to cant said section with respect to said tractor about a substantially horizonal-longitudinal axis; and a dual-gravity, responsive-unit carried by said boring section, comprising means responsive to the horizontal position of said boring section about such transverse axis, and means connected thereto and operatively associated with said power-driven verti-course steering means, and the corresponding guide means automatically maintaining the vertical course of the machine longitudinally of the bore; and means responsive to the horizontal position of said head about such longitudinal axis, and means connected thereto and operatively associated with said power-driven boring-section canting means and the corresponding guide means, automatically maintaining the horizontal course of the machine transversely of the bore.

2. In a remotely controlled bore mining machine a dual-automatic course controller comprising the combination set forth in claim 1, including adjustable means located at a remote station outside of the bore, combined with said automatic means for setting at said station the vertical course of the machine longitudinally of the bore.

3. In remotely controlled mining apparatus comprising a self-propelled machine adapted to bore a tunnel into the earth, the combination with a bore mining machine comprising an articulated body composed of a tractor and front boring section, the tractor comprising power-operated means for driving the body, means pivotally connecting said boring section forwardly of the tractor for tilting movement about a horizontal-transverse axis, said boring section comprising power-driven earth boring means disposed in the front thereof, and power-driven vertical steering means mounted on said body for adjusting the tilt of said boring section with respect to said tractor about such axis; of an adjustable-automatic course controller for said bore mining machine, comprising a signal circuit including a bridge consisting of a first potentiometer having a relatively movable contact which is responsive to the position of said boring section with respect to the horizontal longiudinally of the bore, a second potentiometer having a relatively movable contact which is manually adjustable, and a source of current connected to said bridge, and relay means responsive to any unbalance of said bridge operating said power-driven vertical steering means to tilt said boring section so as to bring said bridge back into balance, thus automatically controlling the vertical course of the mining machine longitudinally of the bore underground as determined by the contact adjustment of the second potentiometer.

4. In remotely controlled mining apparaus, as defined by claim 3, a control station outside of the bore containing said second potentiometer, so that the vertical course of the machine can be adjusted at such station while the machine is operating in the bore.

5. In remotely controlled mining apparatus, as defined by claim 4, a meter located at said station responsive to any unbalance of said bridge for indicating any deviation of course of the machine from that desired.

6. In remotely controlled mining apparatus comprising a self-propelled machine adapted to bore a tunnel into the earth, the combination with a bore mining machine comprising an articulated body composed of a tractor and front boring section the tractor comprising power-operated means for driving the body, means pivotally connecting said boring section forwardly of the tractor for canting movement about a horizontal-longitudinal axis, said boring section comprising power-driven earth boring means disposed in the front thereof, and power-driven canting means mounted on said body for adjusting the cant of said boring section with respect to said tractor about such axis; of an automatic course controller for said bore mining machine, comprising a signal circuit including a bridge consisting of a first potentiometer having a relatively movable contact which is responsive to the position of said boring section with respect to the horizontal transversely of the bore, a second potentiometer having a normally fixed contact which can be preset, and a source of current connected to said bridge; and relay means responsive to any unbalance of said bridge operating said power-driven means to cant said boring section so as to bring said bridge back into balance, thus automatically controlling the horizontal course of the mining machine transversely of the bore underground.

7. Automatic mining apparatus comprising the combination of a bore mining machine, remote control means located at a safe station away from the zone of operation of said machine, means operatively connecting such control means and said machine, said machine comprising an articulated body consisting of a tractor and a boring section, power means acting when energized to move said boring section with respect to said tractor to guide the course of the machine, level sensitive means in said boring section, means responsive to such level sensitive means for producing a signal when such level sensitive means departs from a desired position, means transmitting such signal to said station, means located at said station for receiving such signal and automatically operating said remote control means to energize said power means to tilt said boring section to bring such level sensitive means back into the desired position.

8. Automatic mining apparatus comprising the combination of a bore mining machine including an articulated body consisting of a tractor and a front boring section mounted on the front end thereof for adjustment about a longitudinal axis with respect to such tractor, power means carried by said body for adjusting the position of said boring section on said tractor, means for operating such adjusting means including an electric power cable connected to said tractor and a remote control station, transverse level sensitive means mounted on said boring section, signal producing means responsive to such level sensitive means, signal receiving means located at such remote station, signal transmitting means including an electric signal cable connecting said signal producing means and said receiving means, and automatic means including relay means at such station for causing the signals received by said receiving means to operate such relay means, thereby energizing such power means through said electric power cable, so that said front boring section is automatically kept on a level course transversely of the direction of the bore at all times.

9. Automatic mining apparatus comprising the combination of a bore mining machine, remote control means located at a safe station away from the zone of operation of said machine, means operatively connecting such control means and said machine, said machine comprising an articulated body consisting of a tractor and a boring section, power means acting when energized to move said boring section with respect to said tractor to guide the course of the machine, level sensitive means in said boring section, means responsive to such level sensitive means for producing a signal when such level sensitive means departs from a desired position, means for transmitting such signal to said station, means located at said station for receiving such signal and automatically operating said remote control means to energize said power means to move said boring section to bring such level sensitive means back into the desired position, and manually operated means for over-riding said automatic means, comprising switch means adapted, when operated, to disconnect said automatic means from said power means, and to connect said power means with a source of energy, energizing said power means to move said boring section as desired.

10. Automatic mining apparatus comprising the combination of a bore mining machine including an articulated body having a front boring section, power means carried by said body for adjusting the relative position of said front boring section of said body, means for operating such adjusting means including an electric power cable connected to said tractor and a remote control station, position sensitive means associated with said front boring section, signal producing means responsive to such position sensitive means, signal receiving means located at such remote station, signal transmitting means including an electric signal cable connecting said signal producing means and said receiving means, and automatic means including relay means at such station for causing the signals received by said receiving means to operate such relay means, thereby energizing such power means through said electric power cable, so that said front boring section is automatically kept in a desired position at all times.

11. Automatic mining apparatus as defined in claim 10, including means adapted, when operated, to override said automatic means, and energize said power means directly from a suitable source of energy.

12. The combination with a mining machine comprising a tractor and front boring section pivoted thereto, of an automatic course controller associated therewith comprising deviation sensitive means responsive to any deviation of the boring section from a selected course of such boring section, differential relay means responsive to such course deviation sensitive means, and course direction control means responsive to such differential relay means, controlling the course of the boring section, so that any tendency of the boring section to deviate from the selected course is automatically corrected thereby.

13. The combination as defined by claim 12, in which the course deviation sensitive means comprises an electrical bridge circuit including a source of voltage and two potentiometers each having an adjustable center tap, a deviation signal circuit including both of said taps, level sensitive means mounted on the mining machine and operatively associated with one of said taps, and means for manually adjusting the other one of said taps, for thereby setting the selected course of the machine.

14. A gravity responsive unit for a mining machine, comprising the combination of a tank adapted to be mounted on the mining machine, a horizontal base plate mounted in said tank somewhat above the lower half thereof, at least one level sensitive device disposed within said tank comprising, a bracket having spaced vertical walls mounted on said base plate, upper and lower shafts carried by friction-minimizing bearings in said walls, a wheel mounted on the upper shaft to rotate such shaft, a segment mounted on the lower shaft, anti-backlash means including a thread wound on said wheel and connected at its opposite ends to the sides of said segment operative to transmit any motion of the segment to the upper shaft with a minimum of slippage in either direction, said plate and bracket having an opening below said lower shaft, a pendulum rod connected to said segment below such shaft and depending through said opening, a pendulum weight mounted on the lower end of said rod, baffle plates mounted on the front and back faces of said pendulum weight, baffle plates depending from said plate in spaced adjacent relation to the sides of said pendulum weight, a micro-torque potentiometer mounted on an extension of a wall of said bracket, having a shaft axially alined with said upper shaft, a flexible tubular coupling connecting such latter shafts, so that any deviation of the tank from the vertical causes a corresponding movement of the shaft of the potentiometer by virtue of the force of gravity on the pendulum weight, liquid filling the tank, and a cover closing the top of the tank and sealing such liquid therein.

15. A level sensitive device as defined by claim 14, which is provided with two level sensitive devices arranged at right angles to each other.

References Cited in the file of this patent

UNITED STATES PATENTS

| | | |
|---|---|---|
| 2,198,523 | Adams | Apr. 23, 1940 |
| 2,232,360 | Barnett | Feb. 18, 1941 |
| 2,310,930 | Blanchett | Feb. 16, 1943 |
| 2,320,196 | Roe | May 25, 1943 |
| 2,384,397 | Ramsay | Sept. 4, 1945 |
| 2,466,702 | Hamby | Apr. 12, 1949 |
| 2,571,260 | Kutzler | Oct. 16, 1951 |
| 2,602,611 | Glenny | July 8, 1952 |
| 2,699,328 | Alspaugh et al. | Jan. 11, 1955 |

OTHER REFERENCES

Coal Age, December 1948, pp. 84–87 (262–15).